June 14, 1949.  A. G. BURNS  2,472,806
AUTOMATIC ELECTRIC ANIMAL TRAP
Filed April 17, 1945  3 Sheets-Sheet 1
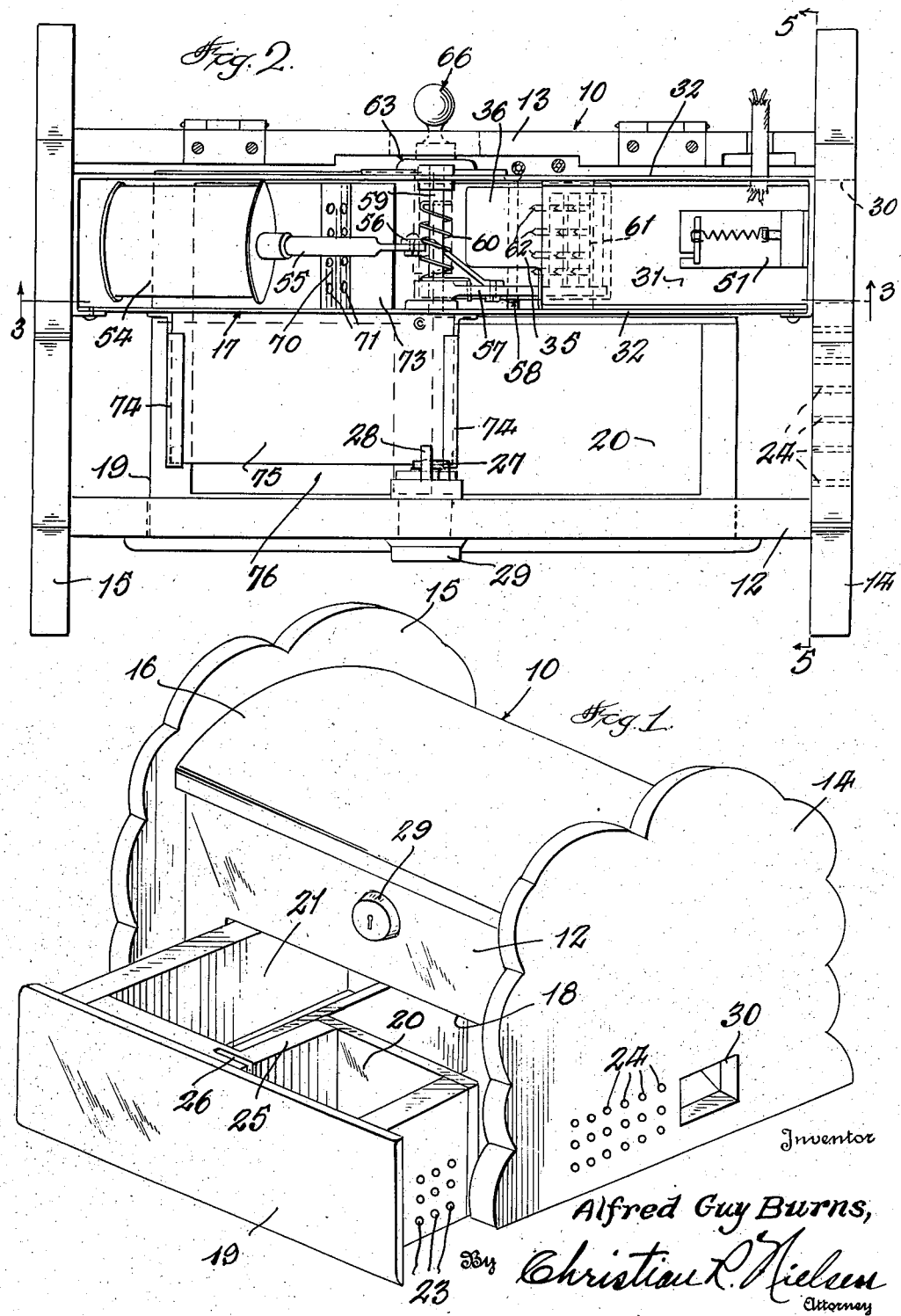
Inventor
Alfred Guy Burns,
By Christian L. Nielsen
Attorney

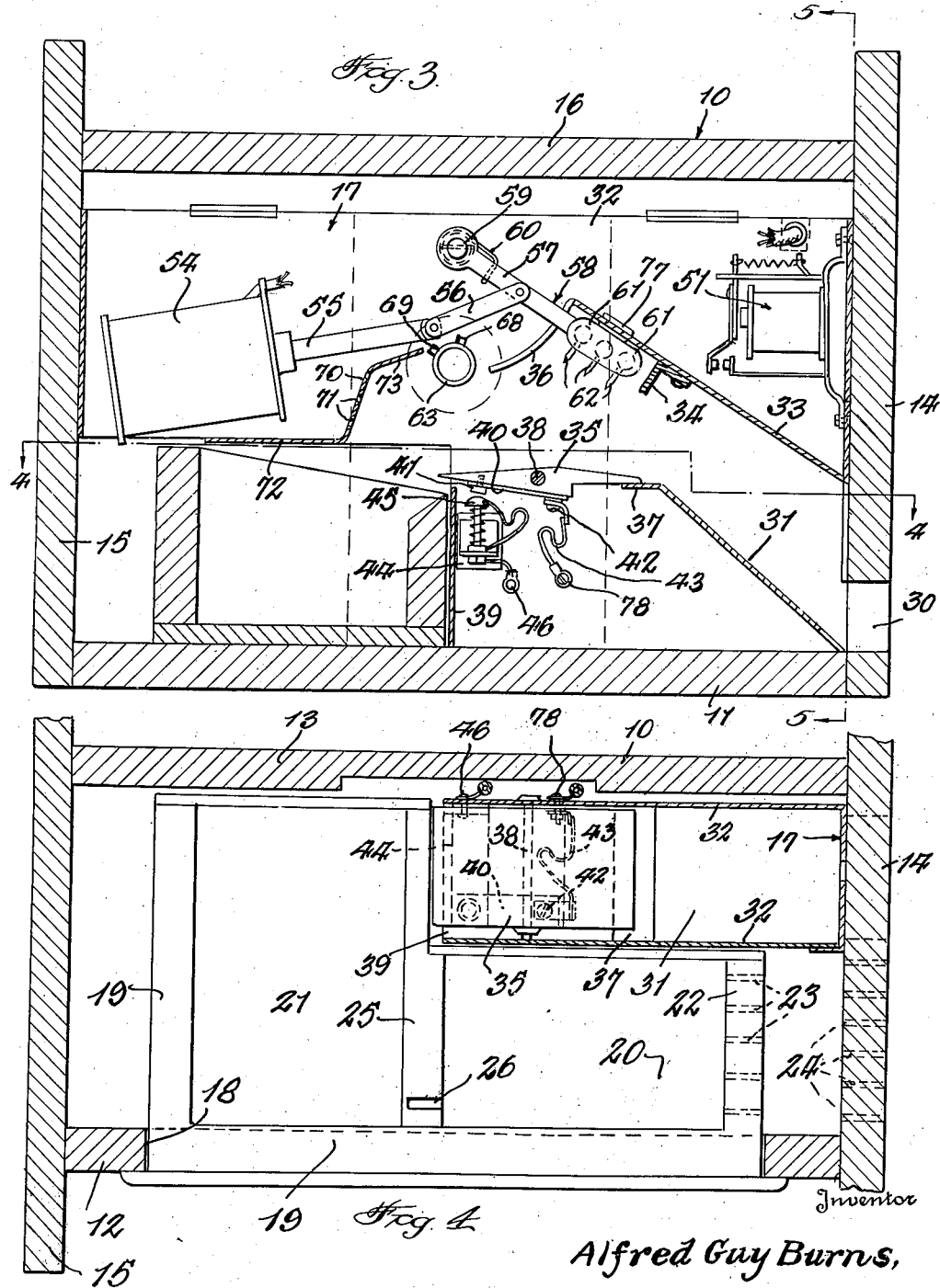

June 14, 1949.  A. G. BURNS  2,472,806
AUTOMATIC ELECTRIC ANIMAL TRAP
Filed April 17, 1945  3 Sheets-Sheet 3
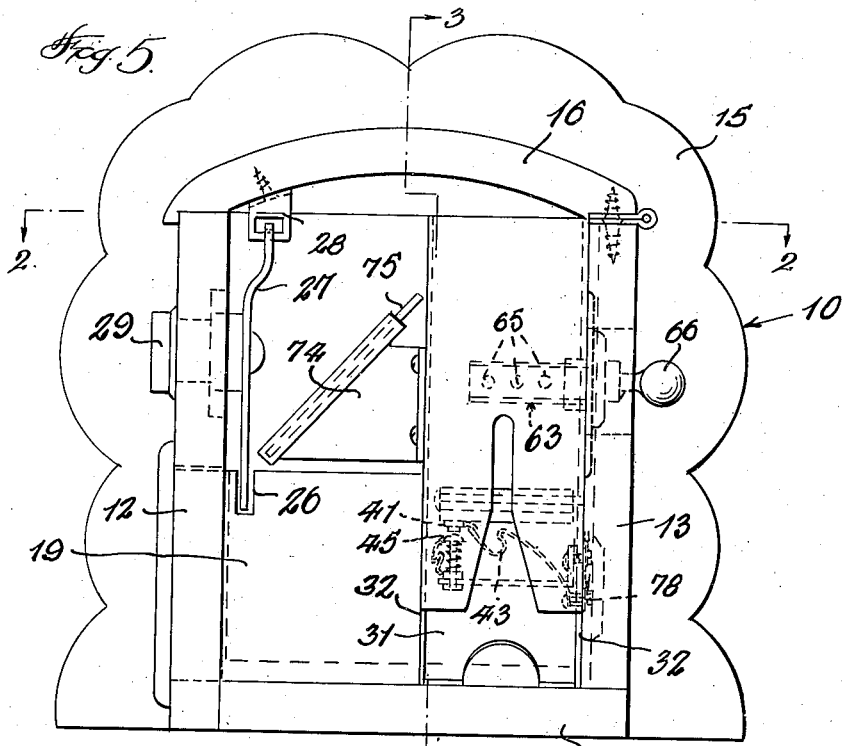
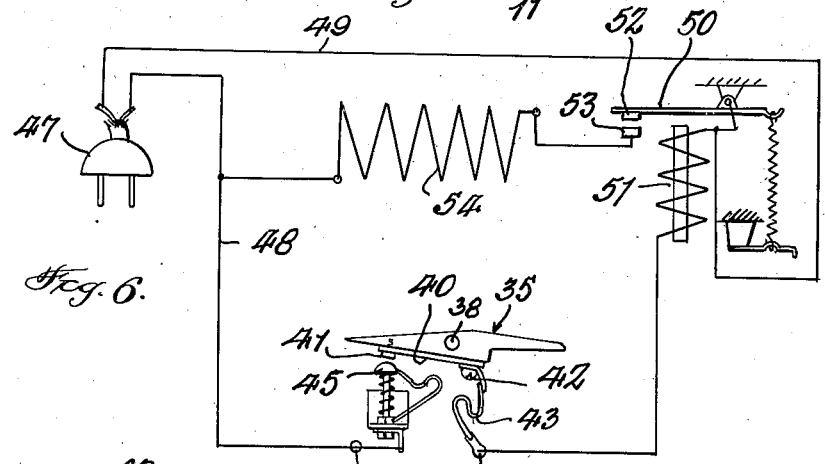
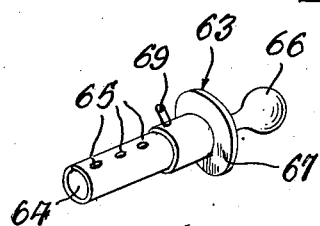
Inventor
Alfred Guy Burns,
By Christian L. Nielsen
Attorney Patented June 14, 1949

2,472,806

UNITED STATES PATENT OFFICE 2,472,806

AUTOMATIC ELECTRIC ANIMAL TRAP

Alfred G. Burns, Farmland, Ind.

Application April 17, 1945, Serial No. 588,770

6 Claims. (Cl. 43—99)

This invention relates to an animal trap of an automatic electric type, and it consists in the constructions, arrangements and combinations herein described and claimed.

It is an object of the invention to provide an animal trap of the everset type, in which the rodent is quickly destroyed and deposited within a compartment of the trap, whereupon the operating mechanism is automatically returned to a set position for the next rodent.

It is also an object of the invention to provide an automatic electric rodent trap in the form of a cabinet in which bait holding means are employed, to entice the rodent into the trap, so located that the rodent cannot contact the bait, and further including a removable drawer into which a dead rodent may be deposited, thus providing a trap which is entirely sanitary, since handling of contaminated bait is avoided, and also, it is not necessary to come into actual contact with the rodents when removing them from the trap.

More specifically, it is an object of the invention to provide an automatic electric rodent trap in which a rockable platform is employed to energize an electrical circuit to effect actuation of a strike device for killing the rodent which may have encountered and rocked the platform.

Additional objects, advantages and features of invention will be apparent from the following description and accompanying drawings, wherein, Figure 1 is a perspective view of the trap, with the drawer and bait box in open position.

Figure 2 is a top plan view of the trap with the top removed.

Figure 3 is a section on the line 3—3 of Figure 2.

Figure 4 is a cross section on the line 4—4 of Figure 3.

Figure 5 is an end elevation with the end wall removed.

Figure 6 is a view illustrating the wiring diagram.

Figure 7 is a perspective view of a bait holder.

There is illustrated a trap 10 in the form of a cabinet including a base 11, side walls 12 and 13, respective end walls 14 and 15 and a hinged closure 16.

It should be understood that the trap may be made in various sizes, depending upon the rodents to be destroyed, and in the case of a large trap, it will be effective in destroying both large and small rodents.

The cabinet is of rectangular form as seen in plan, and within the cabinet a frame structure 17 is mounted, snugly fitted and secured between the end walls 14 and 15, the frame functioning for support of the operative mechanism, presently to be described.

The wall 12 of the cabinet is provided with an opening 18 extending to the upper surface of the base 11 and receives therein a drawer 19, which as may be seen in Figure 4, is substantially L-shaped in plan, providing a bait compartment 20 and a compartment 21 for receiving the bodies of the dead rodents. The end wall 22 of the compartment 20 is formed with a plurality of openings 23 adapted to register with openings 24 formed in the wall 14 of the cabinet. It will be apparent that odor of the bait placed in the compartment 20 may pass through the openings to the exterior of the compartment and thus attract the animals to the trap.

The dividing partition 25 between the compartments 20 and 21 is formed with a transverse slot 26 adapted to receive one end of a latch arm 27, the other end of the arm engaging a keeper 28 secured to the underside of the closure 16. The latch arm 27 is operatively connected to a lock 29. In the locked position shown in Figure 5, the drawer 19 and the closure 16 will be held against opening but the latch arm 27 may be moved by means of a suitable key inserted in the lock 29 and thus permit opening of the drawer and closure.

As may be seen in Figure 1, an entrance opening 30 is formed in the end wall 14 next adjacent the openings 24 and inwardly of the entrance opening, a ramp 31 is provided, fixed in an inclined position between side walls 32 of the frame 17. Above the ramp 31, in spaced relation there is a plate 33, inclined in an upward direction and supported by an angle bar 34 which is fixed between the walls 32 of the frame. The ramp 31, the side walls 32 and the plate 33 form a runway for guidance of an animal to a tilting platform 35, presently to be described.

The plate 33 has a downwardly curved terminal end 36 overlying the major portion of the platform 35 for a purpose as will appear as the description proceeds. The inner terminal end 37 of the ramp 31 is disposed in a horizontal plane and affords a support for the front end of the platform 35.

A shaft 38 is mounted between the side walls 32 of the frame and positioned medially between the end 37 of the ramp and the end wall 39 of the frame, for rockably mounting the platform 35. The platform 35 is substantially rectangular as seen in plan, and the shaft 38 is engaged transversely through the platform at a point so that the front end thereof rests upon the end 37 of the ramp in the set position of the trap.

Upon the under side of the platform 35 there is secured a contact strip 40 by means of contact bolt 41 and bolt 42, the latter having one end of a flexible pig-tail 43 connected thereto, the other end being electrically connected with a binding post 78 mounted in a side wall 32 of the frame.

A suitable bracket 44 is secured upon the wall 32 and has a contact button 45 disposed in the path of movement of the platform 35, so as to bring into electrical engagement the contact bolt 41 and the contact button 45. A pig-tail leads from the contact button 45 to an insulated binding post 46 fixed in the wall 32.

Attention is now invited to Figure 6 of the drawing for an understanding of the wiring hook-up of the apparatus. A conventional connector plug 47 is employed for establishing connection with a usual outlet of a house or similar circuit. One line 48 leads to the contact 46, the other lead 49 being electrically connected to a spring tensioned breaker arm 50, there being also included in the line 50 a relay 51, the latter being electrically connected to the binding post 78. The arm 50 has a contact 52 cooperable with a contact 53 electrically connected to one end of a solenoid coil 54, the opposite end of the coil being connected to the lead 48. In the normal or set position of the trap the contacts 41 and 45 and 52 and 53 will be in their separated positions. However, when a rodent treads upon the platform 35 the latter will swing downwardly so as to engage contacts 41 and 45 completing the current through the relay 51 which will draw the arm 50 downwardly so as to engage contacts 52 and 53, which will energize the solenoid 54 for actuating a rodent-striking lever now to be described.

The solenoid 54 is suitably mounted in the frame 17 at the end opposite the entrance opening 30, the reciprocating plunger 55 of which is pivotally connected to a link 56, which in turn is similarly connected to an arm 57 of the strike lever, generally indicated at 58. The arm 57 is swingably mounted upon a transverse shaft 59 fixed between the walls 32 of the frame. A spring 60 is engaged about the shaft 59, one end being fixed thereto the opposite end being engaged under the arm 57 for holding the latter in fully raised position as shown in Figure 3, and also holding the plunger 55 withdrawn from the solenoid.

The free end of the lever 57 has a right angularly extended head 61, the underside of which has fixed therein a plurality of sharp needle members 62 arranged in rows across the head.

In order to induce a rodent to tread upon the platform 35 a bait holder 63 is mounted in the cabinet wall 13. The holder 63 consists of an open ended casing 64, of elongated form, in which a plurality of openings 65 are formed, permitting escape of odors of bait which is housed within the casing. The holder also includes a knob 66 and a flange 67 which functions as a stop, limiting upward movement of the holder, since the latter will engage the wall 13 of the cabinet when fully engaged. It is also desirable to have the holder releasably secured in the wall and to this end the opening in the wall 13 for receiving the holder is formed with a radially extended slot 68 for admission of a radially extended pin 69 fixed on the periphery of the casing. It will be apparent that with the pin in registry with the slot, the holder may be readily inserted through the opening end. By turning the holder a short distance the pin will be moved out of registry with the slot and thus secure the holder in proper position. The holder is preferably mounted so as to extend transversely above the platform at the inner end thereof.

A strike plate 70 is suitably mounted in the frame 17, in the path of movement of the head 61 and is provided with a plurality of apertures 71 adapted to receive respective needles 62 when the latter is actuated by the solenoid 54. The plate 70 includes a horizontal portion 72 which lies closely above the compartment 21 so as to partly cover the rear portion thereof and will function to prevent an injured rodent from escaping from the compartment. From the portion 72 of the plate, the latter is continued upwardly at an inclination and thence extended forwardly as at 73, providing a passage for reciprocation of the strike lever 58, as well as passage of the body of a rodent impaled or struck by the lever.

Upon the front wall 32 of the frame 17 a pair of brackets 74 is secured, extending forwardly above the front portion of the compartment 21 and between these brackets there is mounted a pane of glass 75 permitting inspection of the compartment upon opening of the closure cover 16. The glass 75 does not fully close the compartment but stops short of the front wall a distance providing a space 76 (see Fig. 2).

The operation is substantially as follows, attention being invited to Figure 3. The rodent enters the opening 30, climbs the ramp 31 and passes onto the platform 35 and advances toward the bait holder 63. Thus the balance of the platform is overcome due to the weight of the rodent, bringing contact 41 into engagement with contact 45 which will immediately energize relay 51 and the solenoid 54, which will then draw the strike lever 58 forcibly in the direction of the plate 70. Since the rodent is positioned in the path of the head 61 of the strike lever, the needles 62 will be driven into the body of the rodent which will be instantly killed. The body will be ordinarily dislodged from the needles upon backward swinging movement of the lever, but if the rodent was not killed on the first stroke and released, the body of the rodent will again contact the platform and cause a repetition of the swinging action of the strike lever.

If for any reason, the rodent is not immediately killed and gets into the compartment 21, the animal will naturally make attempts to escape and since the only exit is by way of the platform 35, it will be apparent that when the animal lands on the platform or otherwise contacts the same, so as to unbalance it, the strike lever will be actuated as described, so as to impale the animal and destroy it. A bumper 77 is employed to reduce the backward impact of the strike lever.

Inspection of the compartment 21 may be had by actuating the latch 27 and raising the cover 16 and looking through the glass. In the event that a rodent therein is alive, it is possible to excite it by inserting a stick through the space 76, causing the animal to seek exit by way of the paltform, thus energizing the relay and solenoid for actuating the strike lever.

While I have shown and described a preferred form of the device, this is by way of illustration only, and I consider as my own all such modifications in construction as fairly fall within the scope of the appended claims.

I claim:

1. An automatic everset electrical animal trap comprising a cabinet having an entrance opening, a ramp within the cabinet in advance of the opening, a tiltable platform at the upper end of the ramp, a body-receiving compartment in said cabinet in advance of said platform, a swinging strike lever above the platform, an electrical contact on said platform, an electrical contact normally spaced from said first named contact, but engageable upon downward swinging movement of the platform, an electrical circuit connected between said contacts, said circuit including means for forcibly swinging said strike lever, and a strike plate mounted in the cabinet in the path of forward swinging movement of said strike lever.

2. The structure of claim 1 in which said strike lever includes a right angularly extended head and said head has a plurality of spaced needle members presented in the direction of forward swinging movement of the strike lever.

3. An automatic everset electrical animal trap comprising a cabinet having a base, end and side walls and a hinged closure cover, one side wall having a drawer slidably mounted therethrough, said drawer comprising a body-receiving compartment and a bait compartment, one wall of the drawer defining the bait compartment having a multiplicity of openings therein, the end wall of the cabinet next adjacent having a multiplicity of openings therethrough, and an animal entrance opening, a ramp within said cabinet in advance of the opening, a tiltable platform at the upper end of the ramp and having its inner end disposed above the body-receiving compartment, and said ramp including an upper wall the terminal end being disposed above said platform, a bait holder within the cabinet disposed above the innermost end of the platform, a swinging strike lever mounted in said cabinet above the platform, said strike lever having a right angularly disposed head adapted to traverse a path above said platform, said head having a multiplicity of needle-like members, and electrically actuated means for swinging the strike lever upon tilting of said platform.

4. The structure of claim 3 in which a glass plate partially covers the body receiving compartment and a strike plate is positioned over the remainder of said compartment in the path of the head of said strike lever.

5. The structure of claim 3, in which the strike lever includes a spring for maintaining the lever in raised position.

6. An automatic everset electrical animal trap comprising a cabinet having a base, end and side walls and a hinged closure cover, one side wall having a drawer slidably mounted therethrough, said drawer comprising a body-receiving compartment and a bait compartment, one wall of the drawer defining the bait compartment having a multiplicity of openings therein, the end wall of the cabinet next adjacent having a multiplicity of openings therethrough, and an animal entrance opening, a ramp within said cabinet in advance of the opening, a tiltable platform at the upper end of the ramp and having its inner end disposed above the body-receiving compartment and said ramp including an upper wall, the terminal end being disposed above said platform, a bait holder within the cabinet disposed above the innermost end of the platform, a transverse shaft within the cabinet above said platform, a strike lever swingably mounted on said shaft, spring means connected between the shaft and strike lever for holding the latter in raised position against the upper wall of the ramp, a solenoid within the cabinet including a plunger, a link connecting said striking lever to said plunger, a relay in electrical circuit with said solenoid, one side of said solenoid being electrically connected to a contact disposed beneath said platform, an electrical contact carried by said platform and in circuit with said relay, whereby tilting of the platform will close the circuit between said solenoid and relay to forcibly swing said strike lever, said strike lever having a head member adapted to traverse a path longitudinally of said platform and said head having a multiplicity of needle-like members presented in the direction of forward swinging movement of the strike lever.

ALFRED G. BURNS.

REFERENCES CITED

The following references are of record in the file of this patent:

UNITED STATES PATENTS

| Number | Name | Date |
|---|---|---|
| 1,052,957 | Pryor | Feb. 11, 1913 |
| 1,084,071 | Darling | Jan. 13, 1914 |